Aug. 19, 1958    M. C. JONES    2,848,683
CALORIMETRIC WATTMETER
Filed Oct. 27, 1955

INVENTOR
MACK C. JONES

BY
*Lindsey and Prutyman*
ATTORNEYS

United States Patent Office 2,848,683
Patented Aug. 19, 1958

2,848,683

CALORIMETRIC WATTMETER

Mack C. Jones, Unionville, Conn.

Application October 27, 1955, Serial No. 543,162

2 Claims. (Cl. 324—92)

This invention relates to wattmeters, and more particularly to an improved wattmeter of the calorimetric type for measuring power particularly in the radio frequency range.

Calorimetric wattmeters are known in which all or a portion of the power in a source to be measured is converted to heat in a dissipative load, and the heat is absorbed in a flowing medium whose flow rate and temperature rise provide a measure of the power applied to the load. Such arrangements have several disadvantages, however, outstanding among which is the fact that the device must be connected to an external source of fluid, the flow rate of the fluid must be held constant, and readings of both flow rate and inlet and outlet temperatures must be obtained. Hence, such apparatus is bulky, complicated, inconvenient to use, and to a large degree impractical for field or other uses requiring portability or compact size.

Accordingly, one object of the present invention is to provide an improved calorimetric wattmeter which is completely self-contained, requiring no external connections other than to the source of power to be measured, and which provides a direct reading of applied power.

Another object is to provide a calorimetric wattmeter which is capable of accurately measuring power at all frequencies from direct current through the radio frequency range, yet which may be conveniently calibrated with direct current.

Another object is to provide a calorimetric wattmeter to which power from the source being measured need be applied for only a few seconds in order to obtain an accurate measurement.

Another object is to provide a wattmeter of the type referred to, whose physical size and weight, for measurement of a given power level, may be substantially reduced in comparison with prior art devices.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
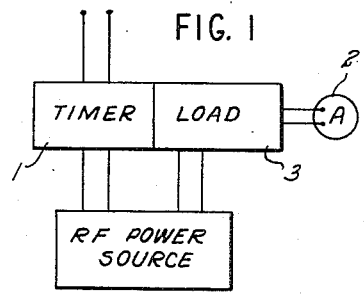
Figure 1 is a simplified schematic diagram of a wattmeter constructed in accordance with the present invention connected to a radio frequency power source.

Referring to the drawing, a wattmeter constructed in accordance with the present invention includes a timer or time-controlled electric switch 1, a microammeter 2, and a load unit 3.

The load unit 3 includes a section of coaxial transmission line which is terminated in a nonreflective artificial load. The line consists of an outer conductor 4 and a center conductor 6 and the load consists of a power absorbing resistor 8 terminating the center conductor, and a conductive sleeve 10 having an impedance matching taper terminating the outer conductor 4. The resistor 8 may consist, for example, of a ceramic cylinder covered with a thin conductive coating such as silver or carbon, and the tapered conductor 10 may be made, for example, of sheet copper.

The input end of the line is provided with a connector 12 adapted to be connected to the power source to be measured. When the size of the connector is relatively small, as shown, the line may have a tapering cross section to accommodate the connector 12 at its input end, yet provide a substantial cross sectional area adjacent the resistor 8 without changing the characteristic impedance of the line. The resistor 8 is immersed in a static body of heat transfer fluid 14, such as for example dielectric oil, the fluid being enclosed in a container 16 formed by the outer conductor 4 together with a cylindrical extension thereof surrounding the tapered conductor 10. Connector 12 is fitted with a fluid seal 17 preventing leakage of fluid from the input end of the line. The tapered conductor 10 has perforations 18 permitting free flow of fluid therethrough, and the center conductor 6 is preferably hollow and has openings 20 therein permitting entry of oil to the interior of the conductor 6 and resistor 8. The container 16 is enclosed and supported with the axis of the line upright in a housing 22 having relatively thick insulated walls 24 which prevent the temperature of the static body of heat transfer fluid 14 from being erroneously affected by external heat sources. A bellows 26 is provided in the upper end of the container to accommodate heat expansion of the fluid 14.

Figure 4:
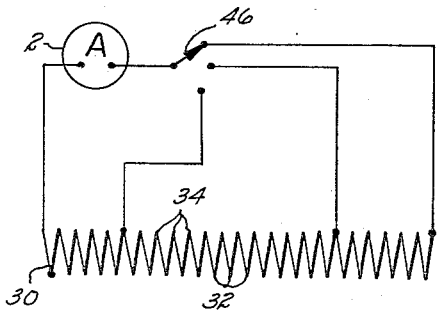
Figure 4 is a schematic diagram of the thermocouple circuit of the wattmeter.
Figure 3:
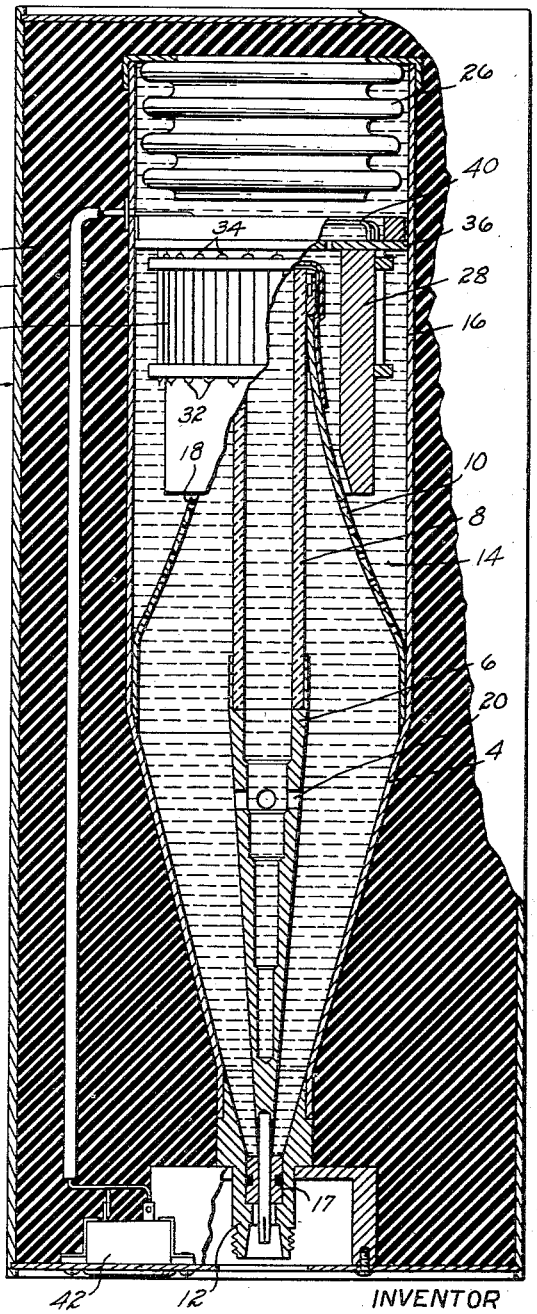
Figure 3 is a vertical sectional view of the wattmeter.

Concentrically surrounding the upper part of the resistor 8 is an annular support 28 on which is mounted an annular thermocouple array immersed in the heat transfer fluid 14. The array consists of a plurality of series-connected thermocouples 30 of the iron-constantan or other suitable type arranged with their cold junctions 32 at a uniform level in the fluid and with their hot junctions 34 vertically spaced above their cold junctions 32. Immediately above the hot junctions 34 is a transverse perforated plate or baffle 36 forming a thermal barrier in the container minimizing heat transfer away from the vicinity of the thermocouples. The ends of the thermocouple array and selected intermediate stations thereon are electrically connected through leads 40 to a multiple connector 42. The connector 42 is in turn connected to the microammeter 2, as shown schematically in Figure 4, through a sensitivity selector switch 46 enabling the output of all or a selected fraction of the array to be applied to the meter 2.

In the operation of the wattmeter, power from the source being measured is applied to the load unit 3 for a short known interval of time, which may be as little as a few seconds of the power source is of large magnitude, or longer if the power source is of smaller magnitude. This interval is manually settable on and controlled by the timer 1 which is connected in series with the power source, as shown in Figure 1, or alternatively may be connected between the power source and the load unit. Since the artificial load is non-reflective, all the energy applied to the resistor 8 is converted to heat regardless of the frequency of the applied power, and hence no account need be taken of the frequency of the applied power in obtaining an accurate power measurement. The heat developed in resistor 8 is transferred directly into the heat transfer fluid which surrounds it, increasing its temperature and causing the heated fluid to rise toward the top of the fluid body while the cooler fluid remains below. Erroneous effects due to external heat sources are minimized by the insulated walls 24 and thus a temperature differential is created between the fluid surrounding the hot junctions 34 of the thermocouples and the fluid further down in the container surrounding the cold junctions 32 of the thermocouples. This temperature differential is a measure of the amount of power applied to the load unit, and is indicated by a proportional reading of the output of the thermocouple array on the ammeter 2.

Figure 2:
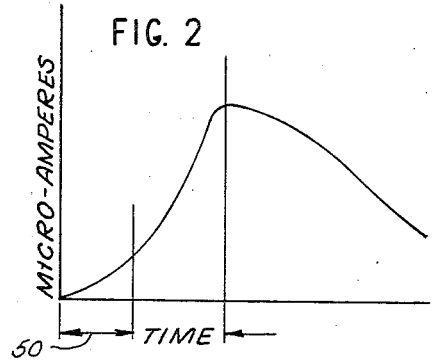
Figure 2 is a graph of an exemplary meter reading obtained with the wattmeter of the present invention.

Figure 2 shows a typical reading of meter 2, plotted against time, resulting from the application of power to the load unit only during the interval 50. As shown in Figure 2, all of the heat energy supplied to the load is not transferred to the fluid body 14 instantaneously. Rather only a part of this energy is transferred to the fluid during the short interval 50, thereby causing a relatively small temperature differential and a relatively small meter deflection. But the temperature of the fluid continues to rise slowly and progressively even after application of power ceases, and the mter reading thus ascends to a maximum which is reached a short time after the power is shut off and which provides a measure of the total energy supplied to the load unit. Since the amount of heat energy transferred to the fluid is proportional to the product of the power and the length of the time interval during which the power is applied, the maximum meter reading is a measure of the average power applied during the interval, and may be calibrated to read directly in watts.

It is one of the principal advantages of a wattmeter constructed as above described that since substantially all of the applied power is converted to heat energy by the non-reflective load, the power measurement is independent of frequency, and hence the meter is not only capable of measuring power over an extremely wide frequency range (for example zero to 3000 megacycles) but may be calibrated very conveniently using D. C. power and the highly accurate D. C. meters which are readily available. Another advantage is that since the body of heat transfer fluid is static and completely enclosed within the container 16, the wattmeter is completely self-contained, requiring no connection to an external source of heat transfer fluid or to an external power supply. Moreover, the arrangement of the thermocouples insures accurate and sensitive measurement of the temperature differential created in the fluid 14 regardless of the amount of power applied to the wattmeter. Finally, since accurate measurements may be obtained without applying power to the instrument for more than a few seconds, the power absorbing components of the instrument need not be of substantial size sufficient to withstand continuous application of power, but may be of relatively small size sufficient for intermittent power application only, and thus the entire instrument may be scaled down accordingly in bulk, weight and cost, without sacrifice in accuracy or ruggedness.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a calorimetric wattmeter, a vertically extending section of transmission line including a center conductor and a coaxial outer conductor, a non-reflective load terminating said line at its upper end including a high loss coaxial impedance element terminating the center conductor and an impedance matching coaxial tapered conductor terminating the outer conductor, said line having a cylindrical extension on the outer conductor thereof surrounding said tapered conductor and forming with the portion of said outer conductor below said tapered conductor a container enclosing the impedance element and tapered conductor, a stationary body of heat transfer fluid filling said container and in which said impedance element and tapered conductor are immersed, an electrical input connector plug closing the lower end of said line and forming a leak-proof mechanical seal therefor, a housing having heat insulating walls surrounding said container, an annular imperforate member concentrically disposed within said cylindrical extension to enclose the terminating ends of said coaxial impedance element and said tapered conductor, a plurality of series-connected thermocouples fixed to the outer wall of said annular member in symmetrical circumferential configuration with their hot junctions in a plane normal to the axis of said line near the terminated end thereof and their cold junctions in a similar plane spaced below the terminating end of the line.

2. A calorimetric wattmeter having a vertical disposition, a transmission line coupling including a center conductor and a coaxial outer conductor, means extending upwardly therefrom for non-reflective load termination of electrical energy flowing through said coupling, said means comprising an upwardly divergent conical housing electrically connected to said outer conductor and leading upwardly into a closed end cylinder, a housing provided with heat insulating walls enclosing said conical housing and cylinder, a hollow elongate metal cone forming an extension of said center conductor and concentrically disposed within said conical housing and provided with wall apertures to permit fluid flow to the interior thereof, a hollow rod of high loss characteristic resistance material forming an axial extension of said cone and provided with a closed end terminating short of the end of said cylinder, an annular housing converging upwardly from a lower portion of said first cylinder to engage the upper end of said rod, an apertured closure plate positioned slightly above the upper ends of said resistive rod and convergent housing to define an upper chamber in said cylinder, a closed bellows in said chamber, a cylinder of imperviate material fixed to said plate to depend therefrom in concentric spaced relation to said cylinder to envelope upper portions of said rod and conical housing, and an array of elongate thermocouple elements secured axially of and in symmetrical configuration to the upper outer wall of said imperviate cylinder with hot junctions thereof in a plane transverse to the cylinder axis adjacent the upper end of said imperviate housing, and the cold junctions thereof in a plane parallel thereto and axially spaced therebelow.

References Cited in the file of this patent

UNITED STATES PATENTS

| | | |
|---|---|---|
| 1,206,304 | Chubb | Nov. 28, 1916 |
| 1,734,837 | Thwing | Nov. 5, 1929 |
| 2,387,158 | Kozanowski | Oct. 16, 1945 |
| 2,398,606 | Wang | Apr. 16, 1946 |
| 2,453,645 | Tiley | Nov. 9, 1948 |
| 2,648,047 | Hollingsworth | Aug. 4, 1953 |
| 2,702,368 | Bird | Feb. 15, 1955 |

FOREIGN PATENTS

| | | |
|---|---|---|
| 36,438 | France | Feb. 18, 1930 |
| | (Addition to No. 548,895) | |
| 719,612 | Germany | Apr. 13, 1942 |
| 695,166 | Great Britain | Aug. 5, 1953 |